United States Patent [19]
Mormile et al.

[11] Patent Number: 5,214,086
[45] Date of Patent: May 25, 1993

[54] COATING COMPOSITIONS WHICH MAY BE AMBIENT CURED

[75] Inventors: Patrick J. Mormile, Bowling Green; Sudhakar Dantiki; Daniel Guyomard, both of Toledo; Stewart Shepler, Bowling Green; Bradley M. Richards, Maumee, all of Ohio

[73] Assignee: BASF Corporation, Parsippany, N.J.

[21] Appl. No.: 754,900

[22] Filed: Sep. 4, 1991

[51] Int. Cl.$^5$ ............................................. C08K 5/29
[52] U.S. Cl. ..................................... 524/237; 524/188
[58] Field of Search ................................ 524/237, 188

[56] References Cited

U.S. PATENT DOCUMENTS

| | | | |
|---|---|---|---|
| 4,507,443 | 3/1985 | Barron et al. | 525/453 |
| 4,847,319 | 7/1989 | Bandlish | 524/188 |
| 4,952,621 | 8/1990 | Bandlish | 524/265 |
| 5,086,107 | 2/1992 | Arai et al. | 524/188 |

FOREIGN PATENT DOCUMENTS

| | | | |
|---|---|---|---|
| 2-117939 | 5/1990 | Japan | 524/237 |
| 86/05798 | 10/1986 | PCT Int'l Appl. | 524/188 |

*Primary Examiner*—Paul R. Michl
*Assistant Examiner*—Olga Asinovsky
*Attorney, Agent, or Firm*—Michael R. Chipaloski

[57] ABSTRACT

Coating Compositions are disclosed which may be ambient cured and are especially useful in refinish paint compositions. The Coating Compositions comprise at least one hydroxy functional resin, at least one isocyanate functional resin and a aldimine or ketimine.

40 Claims, No Drawings

COATING COMPOSITIONS WHICH MAY BE AMBIENT CURED

BACKGROUND OF THE INVENTION

The present invention relates to a novel coating composition which may be cured at ambient conditions or which can be baked. The coatings are especially useful as automotive refinish paint compositions. Such compositions can contain at least one pigment and other well known paint additives such as fillers, rheology control agents, dispersing agents, etc.

The coating composition comprises:
a) an hydroxyl functional resin,
b) at least one isocyanate and
c) a compound having the structure

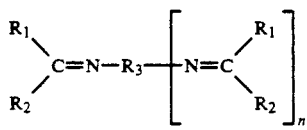

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain O, N, S or Si.

$R_1$ and $R_2$ may be the same or different.

More particularly, the present invention comprises an ambient cure coating composition comprising:
a) an hydroxyl functional resin
b) at least one isocyanate functional resin
c) a compound having the structure

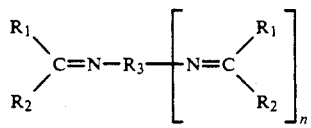

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain O, N, S or Si.

$R_1$ and $R_2$ may be the same or different, and
d) a secondary amine functional reactant.

The coatings may be cured at room or ambient temperature and are especially useful in refinish paint compositions. The coatings may also be baked to cure. Paint compositions contain at least one pigment and can contain other known paint additives such as fillers, rheology control agents, dispersing agents, etc.

U.S. Pat. No. 4,895,883 describes polyurethane ureas which may be obtained by the reaction of a hydrophilic NCO prepolymer or a mixture of hydrophilic prepolymer and hydrophobic prepolymer, the mixture containing at least 30% by weight of the hydrophilic prepolymer, with an aldimine or ketimine-containing hardener mixture in the presence of water and organic solvents, approximately 30–70% of NCO groups of the prepolymers being reacted with the amino groups of the hardener and the remainder reacting with water.

Preparation of a storage-stable, moisture-cured, single component polyurethane system containing polyaldimine or mixtures of polyaldimines is reported in the U.S. Pat. No. 4,853,454. In this system, optionally aromatic and/or aliphatic carboxylic acid or aryl sulfonic acid is incorporated as a catalyst for the aldimine hydrolysis.

U.S. Pat. No. 4,847,319 teaches the sealant compositions or coatings mixtures containing functional silane promotors non-reactive with blocked isocyanates wherein a ketimine may be used as curing agent to improve the adhesion.

U.S. Pat. No. 4,720,535 relates to moisture tempered, storage stable, single component polyurethane systems.

SUMMARY OF THE INVENTION

The present invention relates to a novel coating composition.

The coating composition comprises:
a) an hydroxyl functional resin,
b) at least one isocyanate functional resin and
c) a compound having the structure

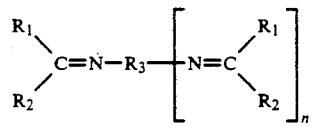

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic aryl, or cycloaliphatic group, and
$R_3$ is aliphatic, aromatic, arylaliphatic or cycloaliphatic group, which may also contain O, N, S or Si.

$R_1$ and $R_2$ may be the same or different.

More particularly, the present invention comprises an ambient cure coating composition of the following composition:
a) an hydroxyl functional resin,
b) at least one isocyanate functional resin,
c) a compound having the structure

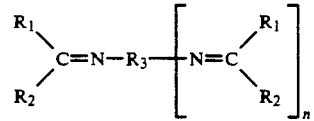

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain O, N, S or Si.

$R_1$ and $R_2$ may be the same or different and d) a secondary amine functional reactant.

The coatings may be cured at room or ambient temperatures and are especially useful in refinish paint compositions. The coatings may also be baked to cure.

This invention also describes a method to reduce the volatile organic content (VOC) of a paint composition by increasing the solids in a paint composition without adversely affecting the sprayable viscosity of the paint and also without significantly decreasing the durability or performance of the composition and to a paint composition so produced.

This invention also relates to a method to increase the solids and/or reduce the volatile organic component of paint in an already existing, commercial paint line and to the paint produced.

This invention also describes a process and compositions wherein aldimines or ketimines are used to accelerate the cure reaction of hydroxy containing polymers with a polyisocyanates. Coating compositions produced by this process result in faster dry times as well as better chemical and water resistance.

DETAILED DESCRIPTION OF THE INVENTION

The present invention relates to a novel coating composition.

The coating composition comprises:
a) an hydroxyl functional resin,
b) at least one isocyanate functional resin and
c) a compound having the structure

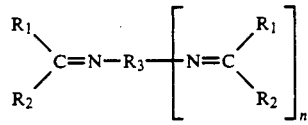

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain O, N, S or Si.

$R_1$ and $R_2$ may be the same or different.

More particularly, the present invention comprises an ambient cure coating composition of the following composition:
a) an hydroxyl functional resin
b) at least one isocyanate functional resin,
c) a compound having the structure

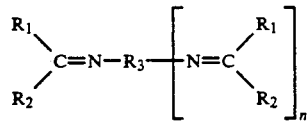

wherein
n is 0 to 4,
$R_1$ is -H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain O, N, S or Si.

$R_1$ and $R_2$ may be the same or different.

The preferred compounds of the structure are obtained from the reaction between a diamine and a aldehyde or a ketone. The amines preferred in this invention correspond to the formula

wherein
R is aliphatic, aromatic, cycloaliphatic or arylaliphatic, $C_2$-$C_{18}$,
which may be a saturated or unsaturated group, which may also contain O, S, or N. Suitable amines include ethylene diamine, ethylene glycol diamine, propylene glycol diamine, cycloaliphatic diamines. The preferred cycloaliphatic diamines include compounds having the following structures:

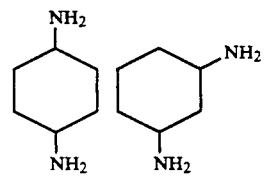

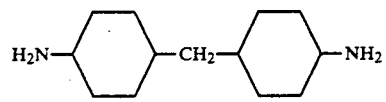

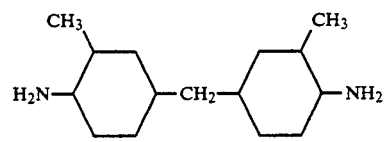

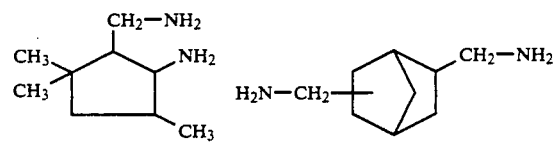

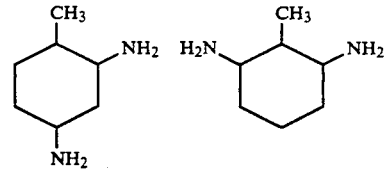

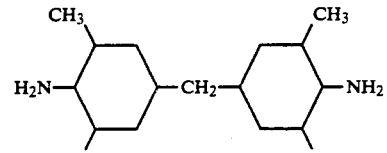

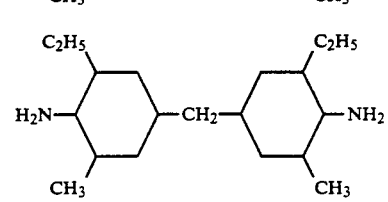

-continued

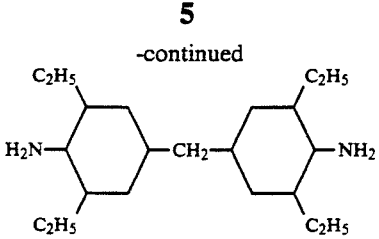

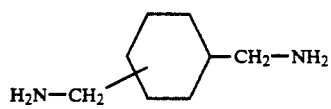

Preferred cycloaliphatic diamines include

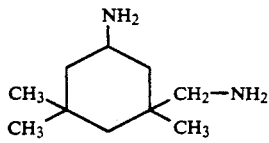

Aldehydes and ketones suitable for use in accordance with the invention are those containing 1 to 8 and preferably 3 to 6 carbon atoms such as propionaldehyde, butyralidehyde, isobutyraldehyde, acetone, methyl ethyl ketone, methyl isobutyl ketone, diisopropyl ketone, cyclopentanone, and cyclohexanone.

This invention also describes a method to reduce the volatile organic content (VOC) of a paint composition by increasing the solids in a paint composition without adversely affecting decreasing the durability or performance of the composition.

This invention also relates to a method to increase the solids and/or reduce the volatile organic component of paint in an already existing commercial paint line.

Useful hydroxyl functional resins are those polymers which have at least one hydroxyl group contained in the backbone. These polymers would have a composition which would have a sprayable solution viscosity at the solids required to transfer a suitable amount of material to the intended substrate. These polymers may contain acrylic, polyester, alkyd/acrylic, polyether or other constituent materials known to the art. Some commercial examples of these materials are as follows:

Acrylic hydroxyl - Joncryl 500, Johnsons Wax AU608, Rohm and Haas

Polyester hydroxyl resins - Desmophen 650A-65, Mobay K-Flex 188, King Industries Isocyanates which are useful are di- or polyisocyanates which are aliphatic, cycloaliphatic or aromatic. Such isocyanates include hexamethylene diisocyanate, 1-methyl-2,4-diisocyanatocyclohexane, isophorone diisocyanate, 4, 4, -diisocyanatodicyclohexyl methane, toluene-2-4-diisocyanate, 0-m- and p-xylene diisocyanate, 1-5-naphthylene diisocyanate, masked isocyanates, or mixtures thereof. It is also possible to use polyisocyanates with isocyanurate, alliphanate or uretdione structures. The polyisocyanates may optionally be reacted with a deficit of polyhydroxy compounds, such as water, glycols, polyalkylene glycols, neopentyl glycols, glycerol, trimethylol propane, hexane triol or alkyd resins, before being used.

This invention also describes a process wherein aldimines or ketimines accelerate the cure reaction of hydroxyl containing polymers with a polyisocyanate resulting in faster dry times as well as better chemical and water resistance. The acceleration of the curing reaction makes practical the use, in an already existing paint line, of isocyanates or blends of isocyanates which currently present poor short term film properties.

This invention also relates to a process of formulating paints by using aldimines or ketimines wherein the aldimines or ketimines are not completely hydrolysed into amine and aldehyde or ketone, but probably react with the isocyanate as the imines. This is a very important aspect in this invention because when the aldimine hydrolyses into amine and a volatile compound namely the aldehyde or ketone, the resulting amine reacts instantaneously with the isocyanate and jeopardizes the pot-life and probably appearance of the paint. Also, the hydrolysis results in volatile organic content in the form of aldehyde or ketone and will not be very effective in reducing the VOC. However, mechanisms have been demonstrated whereby these moieties, especially the aldehyde, have the capability to react further with functionalities that are present including reaction products of isocyanate and other constituents in the coating composition. These mechanisms therefor would also have the effect of decreasing the volatile organics emitted from the coating composition.

Useful reactive diluents are those materials which may be added to the coating composition and require little or no solvent, in order to reduce them to spray viscosity. In addition to this, the reactive diluents possess at least one reactive site, thereby allowing them to become crosslinked into the coating matrix. These two factors taken into account yield an effective increase in the solids of the coating composition at application, without detrimental effects on spray viscosity or application properties. Preferred reactive diluents are those that are 1000 cps or less viscosity at 100% non-volatile. These would contain at least two reactive sites allowing them to become part of the crosslinked network structure in the coating system. This type of material would most likely be polyester in nature and could be the reaction product of two moles of butanediol with one mole of adipic acid. Another type could be the reaction product of 2-3 moles of epsilon-caprolactone with a diol such as butanediol or with a triol such as glycerine. Commercial products that fall into the previously mentioned categories of these types of polyesters are Lexorez 1100-220 from Inolex Chemical, Tone 201 and Tone 301 both from Union Carbide.

Useful secondary amine reactive diluents are those materials which may be added to the coating composition and require little or no solvent, in order to be reduced to spray viscosity. In addition to this, they possess at least one active amino hydrogen, thereby allowing them to become crosslinked into the coating matrix. These factors yield an effective increase in solids of the coating composition at application, without detrimental affects on spray viscosity or application properties. Preferred secondary amine reactive diluents are those that are 1500 cps or less viscosity at 100% non-volatile. These would contain at least two active amino hydrogens, allowing them to become part of the crosslink matrix in a continuous scheme. This type of material would most likely be a reaction product via nucleophilic addition, of a di-, primary amine with two moles of a mono unsaturated reactant. A material of this type for example, is a reaction product of one mole of 4,4'-Methylenebis (2 Methyl) Cyclohexanamine with two moles of diethyl maleate.

The composition may also contain pigments. These pigments can be introduced by first forming a mill base with the hydroxyl functional resin utilized in the composition or with other compatible polymers by conventional techniques, such as sandgrinding, ball-milling, attritor grinding, two roll milling to disperse the pigments. The mill base is blended with the film forming constituents as shown in examples which follow.

Coating compositions described by the present invention find utility in applications of ambient film forming and curing such as automotive refinish coatings. It is also suggested that the present invention applies to coatings to be force dried or baked to accelerate the coating curing process. Forced dry conditions range from 100 degrees Fahrenheit to 190 degrees Fahrenheit. Baking conditions common to the art may range from 175 degrees Fahrenheit to over 375 degrees Fahrenheit. The coating cure process for the present invention may also be accelerated by the utilization of radiant heating or Infra Red emitting devices known to the art.

The following examples are intended to illustrate the invention. All quantities are shown on a weight bases unless otherwise indicated.

EXAMPLES 1, 2 and 3

3.5 Voc Coatings Are Formulated By Blending The Following Constituents

ALDIMINE #1 is the reaction product of one mole of 4,4"-Methylenebis (2 Methyl) Cyclohexanamine with 2 moles of Isobutyraldehyde. This reaction was exothermic at 25 degrees Celsius. Water that was generated as a reaction byproduct was distilled off at about 99 degrees Celsius. The reaction product was then heated to about 150 degrees Celsius to remove any unreacted Isobutyraldehyde.

ALDIMINE #2 is the reaction product of one mole of Triethylene glycol diamine with 2 moles of Isobutyraldehyde. This reaction was exothermic at 25 degrees Celsius. Water that was generated as a reaction byproduct was distilled off at about 99 degrees Celsius. The reaction product was then heated to about 150 degrees Celsius to remove any unreacted Isobutyraldehyde.

ACRYLIC POLYMER A polymer of 22.0% Butyl Methacrylate, 30.0% Styrene, 14.0% Hydroxy Ethyl Methacrylate, 8.0% Acrylic Acid and 26.0% the Glycidyl Ester of Neodecanoic Acid which has a number average molecular weight less than 3000.

ISOCYANATE RESIN #1 Hexamethylene Diisocyanate Isocyanurate.

ADDITIVES Mar and slip silicones, Accelerator catalysts.

ORGANIC SOLVENTS common to the art.

|  | Example-1 | Example-2 | Example-3 |
|---|---|---|---|
| Acrylic polymer | 38.30 | 20.38 | 21.97 |
| Aldimine #1 | — | 11.49 | — |
| Aldimine #2 | — | — | 12.39 |
| Organic Solvents | 41.54 | 41.11 | 41.29 |
| Isocyanate Resin #1 | 20.16 | 27.02 | 24.35 |
| Properties: |  |  |  |
| Spray viscosity, sec. | 25.0 | 20.1 | 20.1 |
| VOC, lbs.gal | 3.32 | 3.32 | 3.36 |
| dust free, hours | 5-5½ | <1 | <½ |
| pendulum hardness, 3 days | 72 | 78 | 10 |
| xylene resistance | swelling | no effect | slight swelling |
| gel time, min. | >360 | 130 | 65 |

The dust free time testing is intended to define the time that elapses between film application and the point when the film will not retain particulate material which may come to rest on the film. The test method is as follows; the paint to be tested is spray applied to a 4" by 12" bare steel panel at a dry film thickness of 2.0 to 2.5 mils. At the appropriate time interval, approximately 1.0 gram of clean dry sea sand is applied to &:he surface. The sand is allowed to rest on the surface for 15 seconds, then the panel is struck sharply on its side in order to dislodge the sand. The paint is considered dust free if all or all but a few of the grains of sand are removed.

Pendulum Hardness tester comprises a steel bar capable of oscillating on two hardened steel hemispheres fixed to the underside of the bar. A panel is held level in a suitable clamp above bench level and the pendulum bar is placed upon the surface to be tested with the steel hemispheres in contact with the panel. The pendulum is allowed to swing, measuring a "damping effect" and the time taken (in number of swings), for the decrease from full amplitude of the swing to a deflection of half amplitude (6° to 3°), is taken as the pendulum hardness (Koenig).

Gel Time is measured as the point at which the development of insoluble polymers in the p int make the material impossible to use. It is characterized by a jelly-like appearance and is usually indicative of crosslinking of the system.

The aldimines decreased the spray viscosity of the paint without increasing the VOC. Advantage of aldimines are clearly seen in the significant reduction of dust free times from over 5 hours in the composition without aldimine to less than one hour. In the automotive refinish industry the faster dry time is a definite advantage. Depending on the type of amine used in the preparation of aldimine the physical properties of the films varied Films prepared with Aldimine #2 were lower in pendulum hardness illustrating the formulation latitude for film flexibility given by choice of aldimine or ketimine.

EXAMPLES 4, 5 and 6

The following examples demonstrate the improvements in the art which are achieved by modification of a currently available paint system.

Ambient cured paints are formulated by blending the following constituents.

ACRYLIC ESTER POLYMER A polymer of 8.6% Ethyl Methacrylate, 13.6% Methyl Methacrylate, 33.1% Hydroxy Ethyl Methacrylate, 30.8% Styrene and 13.9% Soya Fatty Acid which has a number average molecular weight less than 4000.

SECONDARY AMINE DILUENT The reaction product of one mole of 4,4'-Methylenebis (2 Methyl) Cyclohexanamine with two moles of Diethyl maleate.

ALDIMINE #3 The reaction product of one mole of Isophorone Diamine with 2 moles of Isobutyraldehyde.

ISOCYANATE RESIN #1 (Examples 1-3).

ISOCYANATE RESIN #2 An approximately 2 to 1 molar ratio mixture of Hexamethylene Diisocyanate Uretdione and Hexamethylene Diisocyanate Isocyanurate.

RED MILL BASE 10.1% of a dispersed organic red pigment, 36.4% of a polymer of 8.6% Ethyl Methacrylate, 13.6% Methyl Methacrylate, 33.1% Hydroxy Ethyl Methacrylate, 30.8% Styrene and 13.9% Soya Fatty Acid which has a number average molecular weight less than 4000 and 53.5% organic solvents.

ADDITIVES Mar and slip silicones, Accelerator catalysts, anti-skinning agent.
ORGANIC SOLVENTS common to the art.

|  | Example-4 | Example-5 | Example-6 |
|---|---|---|---|
| Acrylic ester polymer | 15.7 | 13.5 | 12.7 |
| Red Mill base #1 | 42.2 | 32.2 | 30.1 |
| Aldimine #3 | — | 8.8 | 4.9 |
| Secondary Amine Diluent | — | — | 5.5 |
| Isocyanate Resin #1 (examples 1-3) | 16.8 | 24.0 | 6.3 |
| Isocyanate Resin #2 | — | — | 18.7 |
| Solvents | 24.3 | 20.5 | 20.8 |
| Additives | 1.0 | 1.0 | 1.0 |
| Properties: |  |  |  |
| Spray viscosity, sec. | 27.5 | 25.0 | 21.5 |
| Dust free, min. | 120 | 45 | 75 |
| VOC, lbs/gal | 4.38 | 3.40 | 3.46 |
| Gas resistance, days | 6 | 2-3 | 2-3 |
| Pendulum hardness, 1 day | 24 | 51 | 40 |
| 7 days | 93 | 124 | 101 |
| Stone chip resistance | 6 | 4 | 4-5 |
| Cupping test, mm | 9.2 | 7.8 | 10.0 |
| QUV(313), % Gloss Retention @1000 Hours | 80.4 | 93.9 | — |

Gas of Xylene Resistance is measured by saturating ⅛ of a 2 ½ inch cotton cosmetic pad (cut radially into equal parts) with 1 cc of unleaded premium gasoline or Xylene. This cotton pad is then covered with a metal cap. And a weight (500 gr) is placed on the cap to ensure a seal. After 5 minutes, the weight is removed, along with the cap and cotton pad. The area is then checked for swelling, softening, or other defects.

Stone Chip Resistance is measured according to the VW (Volkswagen) test using irregular steel shot (4-5 mm). 500 gr of the steel shot is propelled at the painted surface with the pressure reduction valve set at 2 bar excess pressure. The steel shot bounces on the test items. The procedure is repeated with the same amount of steel shot. Loose adhering parts are removed with a nylon brush. Then the stressed area is provided with tape which is taped tightly. The tape strips are then torn off the coat surface abruptly.

| RATINGS | |
|---|---|
| SURFACE DAMAGE | RATING |
| 2% | 1 |
| 5% | 2 |
| 10% | 3 |
| 20% | 4 |
| 30% | 5 |
| 40% | 6 |
| 50% | 7 |
| 65% | 8 |
| 80% | 9 |
| 90% | 10 |

The Cupping test measures the distensibility of a coating on a steel panel. The instrument faces a spherical tool of hardened steel against a coated panel held against a die, which has a circular orifice slightly larger than the diameter of the spherical tool. Pressure is maintained until the panel is distorted so as to form a dome-shaped protuberance. The distance moved by the hardened steel indenting the panel is measured by a micrometer gauge attachment and reported as the result.

Example #4 represents a commercial two package acrylic ester/urethane paint system. Example #5 represents the system of example #4 with a significant portion of the acrylic ester resin replaced by an aldimine and the isocyanate functional resin level increased in order to maintain the isocyanate / coreactant index. Example #6 represents the system of example #4 with a significant portion of the acrylic ester resin replaced by a combination of aldimine and secondary amine functional reactive diluent and the isocyanate package has been revised to contain a mixture of the isocyanurate and uretdione of hexamethylene diisocyanate. The levels have again been modified to retain the index of isocyanates and coreactants.

As can be seen from the data charts the VOC is significantly reduced in example #5 when compared to example #4. Furthermore the Dust free time, Gasoline resistance and pendulum hardness are all superior to example #4. Again in example #6 the VOC, Dust free time, Gasoline resistance and Pendulum hardness are all superior to example #4.

These data demonstrate that VOC reduction can be accomplished without reduction in cure and in fact the cure rate significantly increases when the aldimine and aldimine/secondary amine functional reactive diluents are added. In addition, there is a marked improvement in accelerated weathering resistance in the aldimine containing coating (Example 5), as evidenced by the greater degree of gloss retention when compared to the coating without the aldimine (Example 4).

EXAMPLE 7

A 2.8 VOC Paint is formulated by blending the following constituents

RED MILL BASE #2 22.0% dispersed organic red pigment; 42.2% of a polymer of 22.0% Butyl Methacrylate, 30.0% Styrene, 14.0% Hydroxy Ethyl Methacrylate, 8.0% Acrylic Acid and 26.C% the Glycidyl Ester of Neodecanoic Acid which has a number average molecular weight less than 3000; 3.5% pigment dispersing additive; and 32.3% of organic solvents.
ACRYLIC POLYMER (Examples 1-3)
SECONDARY AMINE DILUENT The reaction product of one more of 4,4'-Methylenebis (2 Methyl) Cyclohexanamine with two moles of diethyl maleate.
ADDITIVES Mar and slip silicones, HALS amine.
ISOCYANATE RESIN #1 (Examples 1-3)
ALDIMINE #3 (Examples 4-6)
ORGANIC SOLVENTS Common to the art.
The percentage of these constituent materials are as follows.

|  | WT % |
|---|---|
| RED MILL BASE #2 | 54.6 |
| ACRYLIC POLYMER | 11.0 |
| SECONDARY AMINE DILUENT | 11.2 |
| ADDITIVES | 3.2 |
| ORGANIC SOLVENTS | 19.0 |
| THE ABOVE PAINT IS BLENDED WITH THE FOLLOWING IN THE PRESCRIBED RATIO WHEN THE MATERIAL IS TO BE APPLIED. | |
| 2.8 VOC PAINT (above) | 66.8 |
| ISOCYANATE RESIN #1 | 21.3 |
| ALDIMINE #3 | 3.8 |
| ORGANIC SOLVENTS | 8.1 |
| Properties: | |
| Dust free time | 40 minutes |
| Drying Recorder; | |
| Phase 1 | 0.5 hours |
| Phase 2 | 1.5 hours |
| Phase 3 | 3.0 hours |
| Pot life | 10 minutes |
| VOC | 2.80 pounds/gallon |

-continued

| Koenig Pendulum Hardness | |
|---|---|
| 1 day | 12/25* |
| 4 days | 26/45* |

{* measured over glass at 30 microns/2 mils}

The pot life test is intended to describe the time after a catalyzed paint sample is mixed when it is still low enough in viscosity that it may still be sprayed. The pot life is the time elapsed until the initial Ford #4 viscosity doubles.

The BK Drying recorder is a film integrity tester. A 2.0 to 2.5 mil (dry) film of paint is spray applied to a 1" by 12" glass slide. The slide is immediately placed into the tester and testing is started. The tester pulls a 1.5 mm round end rod (held vertically) across the surface of the paint film at a consistent rate so the mark left on the film can be analyzed and the time that the nature of the mark changes can be recorded. Phase 1 is the time when the paint film has set enough that the paint does not reflow together behind the rod after its passage. Phase 2 is the time when the film has set enough that the rod will ride on top of the paint film instead of being pulled through the film. Phase 3 is the time when the rod no longer leaves a visible mark on the film as it is pulled across the film.

The consistent problem to date in the formulation of 2.8 VOC compliant coatings has been the resins necessary to achieve a sprayable viscosity at the 68 to 70 weight percent solids required for 2.8 VOC are low in molecular weight and low in glass transition temperature. These properties result in long dry times because these resin require a much larger percentage of the reaction to have completed before the film sets physically. Since the normal body repair shop does not have facilities for baking, a method of providing for cure acceleration at ambient temperature is useful. The Aldimine used in this example provides cure acceleration at ambient temperature and also is very desirable because the determined solids of the formulation (ASTM 2369) indicate the Aldimine level retained in the film is near 100%.

The short pot life of this formulation can be addressed by the use of multiple feed spray equipment or possibly by further formulation work.

EXAMPLES #8-10

3.5 Voc Paint With Improved Short And Long Term Curing Properties 3.5 VOC paint is prepared by blending the following constituents.

WHITE MILL BASE 60.0% dispersed titanium dioxide pigment; 24.9% of a polymer of 22.0% Butyl Methacrylate, 30.0% Styrene, 14.0% Hydroxy Ethyl Methacrylate, 8.0% Acrylic Acid and 26.C% the Glycidyl Ester of Neodecanoic Acid which has a number average molecular weight less than 3000; 1.1% of antisettle additives and 14.0% of organic solvents.

ACRYLIC POLYMER (Examples 1-3).

ADDITIVES HALS amines, UV absorbers, Mar and slip silicones, accelerator catalysts.

ALDIMINE #3 (Examples 4-6).

ORGANIC SOLVENTS Common to the art.

Isocyanate Resin #1 (Examples 1-3).

Isocyanate Resin #3 Isophorone Diisocyanate Isocyanurate.

The percentages of these constituent materials for the 3.5 VOC PAINT are as follows.

| | WT % |
|---|---|
| WHITE MILL BASE | 65.8 |
| ACRYLIC POLYMER | 17.4 |
| ADDITIVES | 2.5 |
| ORGANIC SOLVENTS | 14.3 |

The above paint is blended with the following in the prescribed ratio when the materials are to be applied.

| | Example #8 | Example #9 | Example #10 |
|---|---|---|---|
| 3.5 VOC PAINT | 71.9 | 74.4 | 74.4 |
| ORGANIC SOLVENTS | 8.8 | 9.1 | 9.1 |
| ISOCYANATE RESIN #1 | 16.0 | 16.5 | 8.0 |
| ISOCYANATE RESIN #3 | — | — | 8.5 |
| ALDIMINE #3 | 3.3 | — | — |
| Properties: | | | |
| Dust-free Time (hrs.) | 0.5 | 1.0 | 0.75 |
| Tack-free Time (hrs.) | 4.0 | 5.0 | 4.0 |
| Pot-life (hrs.) | 4.0 | 3.0 | 4.0 |
| Drying Recorder (hrs.): | | | |
| Phase 1 | 0.5 | 2.75 | 0.0 |
| Phase 2 | 4.0 | 9.0 | 5.25 |
| Phase 3 | 4.75 | >12.0 | 8.25 |
| Gasoline Resistance (days) | 1-2 | 2 | 4 |
| Koenig Pendulum Hardness* | | | |
| 1 Day drying | 17/23 | 5/7 | 17/24 |
| 7 Days drying | 106/114 | 105/112 | 104/116 |

{*measured over glass at 30 micron/2 mils}

The tack free time testing is intended to define the time that elapses between film application and the point when the film may be handled without permanent impressions being left in the film. The test method is as follows; the paint to be tested is spray applied to a 4" by 12" bare steel panel at a dry film thickness of 2.0 to 2.5 mils. At the appropriate time interval, a 1 inch square piece of typing paper is placed on the film. A 100 gram, 1 inch square, flat weight is then placed on the paper for one minute. Upon removal of the 100 gram weight, the panel is struck sharply on its side in order to dislodge the paper. The paint is considered tack free when the paper comes off the panel when struck.

These examples illustrate the performance differences of a commercially available two package acrylic urethane paint system where an aldimine is used at relatively low concentration to accelerate the cure. The concentration used here is low enough that little effect is observed on VOC but a very significant effect is observed on cure rate.

The commercial system, example #10 employs Isophorone Diisocyanate Isocyanurate as part of the urethane package. The relatively high glass transition temperature of this urethane provides rapid film setting through simple evaporative drying. This high glass transition temperature has the negative side effect of reduced final cure completion because of steric rigidity. Therefore, it is desirable to use as much Hexamethylene Diisocyanate Isocyanurate as possible. The problem has always been the relatively low glass transition temperature of the Hexamethylene Diisocyanate Isocyanurate has always delayed Dust Free time significantly and all attempts to use accelerators to correct this problem have proven unsuccessful because of severe pot life shortening. The aldimine provides cure acceleration without severe effect on pot life.

Examples #11-14

Clearcoats formulated by blending the following constituents and based on a commercially available polyester demonstrate the effectiveness of the claimed art with respect to VOC reduction and dust free times.

POLYESTER RESIN The reaction product of 19.6% Trimethylol Propane, 26.6% Neopentyl Glycol, 21.4% Adipic Acid and 32.5% Phthalic Anhydride reacted to a final acid number of 10 to 15 determined on solids.

KETIMINE The reaction product of one mole of Isophorone Diamine with two moles of Methyl Isobutyl Ketone.

OXAZOLIDINE FUNCTIONAL REACTIVE DILUENT The reaction product of 2 moles of 2-n Hydroxyethyl Isopropyl Oxazolidine with 1 mole of Methyl Adipate.

ISOCYANATE RESIN #1 (Examples 1-3).
ALDIMINE #3 (Examples 4-6).
ORGANIC SOLVENTS Common to the art.

|  | #11 | #12 | #13 | #14 |
|---|---|---|---|---|
| POLYESTER RESIN | 35.5 | 24.1 | 24.1 | 23.8 |
| ORGANIC SOLVENTS | 45.2 | 39.5 | 35.8 | 37.8 |
| KETIMINE | — | 10.3 | 5.0 | — |
| ALDIMINE #3 | — | — | — | 10.2 |
| OXAZOLIDINE FUNCTIONAL REACTIVE DILUENT | — | — | 5.1 | — |
| ISOCYANATE RESIN #1 | 19.3 | 26.1 | 30.0 | 28.2 |
| Properties: |  |  |  |  |
| Viscosity (sec. - Ford #4) | 26 | 27 | 27 | 26 |
| VOC (lbs/gallon) | 3.79 | 3.23 | 3.08 | 3.13 |
| Dust-free Time (hrs) | >8.0 | 1.5 | 3.5 | 1.0 |
| Gasoline Resistance (1 day) | pass | pass | pass | pass |
| Koenig Pendulum Hardness* |  |  |  |  |
| 2 days drying | 63 | 79 | 69 | 64 |
| 29 days drying | 117 | 115 | 96 | 88 |

{*measured over glass at 30 microns}

As can be seen from tables #11-14, VOC is reduced when the aldimine and ketimine are used to replace polyester resin by 30%. Also dust free time is reduced from >8 hours (using polyester resin only), to 1½ hours (as in example 12) and 1 hour (as in example 14). Furthermore, the technology is compatible with and enhances the applicability of oxazolidine functional reactive diluents.

We claim:

1. A coating composition comprising the following:
a) at least one hydroxy functional resin,
b) at least one isocyanate functional resin and
c) a compound having the structure

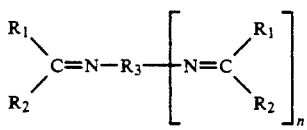

wherein
n is 0 to 4,
R₁ is —H, or alkyl, aryl, cycloaliphatic or substituted alkyl, aryl, or cycloaliphatic group,
R₂ is —H, or alkyl, aryl, cycloaliphatic or substituted alkyl, aryl, or cycloaliphatic group, and
R₃ is aliphatic, aromatic, arylaliphatic or cycloaliphatic group, which may also contain O, N, S or Si.

R₁ and R₂ may be the same or different.

2. A coating composition of claim 1 which is cured at ambient temperature.
3. A coating composition of claim 1 which is baked to cure.
4. A coating composition of claim 1 that additionally contains at least one pigment.
5. A coating composition of claim 1 wherein the hydroxy functional resin is an acrylic resin with a hydroxyl number in the range of 20-200.
6. A coating composition of claim 1 wherein the hydroxy functional resin is an acrylic resin grafted with natural or synthetic fatty acid ester and the resulting resin having a hydroxyl number in the range of 20-200.
7. A coating composition of claim 1 wherein the hydroxy functional resin is a saturated or unsaturated polyester resin with a hydroxyl number of 20-200.
8. A coating composition of claim 1 wherein the isocyanate functional resin is chosen from aliphatic, aromatic or cycloaliphatic mono-, or di- isocyanates, triisocyanurates, uretdiones, biurets or isocyanate functional prepolymers.
9. A coating composition of claim 8 wherein the isocyanate functional resin is a dimer or trimer of hexamethylene diisocyanate or a blend of both.
10. A coating composition comprising the following:
a) at least one hydroxy functional resin,
b) at least one isocyanate functional resin,
c) a compound having the structure

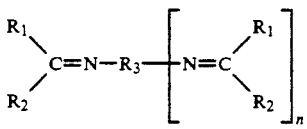

wherein
n is 0 to 4,
R₁ is —H, or alkyl, aryl, cycloaliphatic or substituted alkyl, aryl, or cycloaliphatic group,
R₂ is —H, or alkyl, aryl, cycloaliphatic or substituted alkyl, aryl, or cycloaliphatic group, and
R₃ is aliphatic, aromatic, arylaliphatic or cycloaliphatic group, which may also contain O, N, S or Si.

R₁ and R₂ may be the same or different and
d) a secondary amine functional reactive diluent.

11. A coating composition of claim 10 which is cured at ambient temperature.
12. A coating composition of claim 10 which is baked to cure.
13. A coating composition of claim 10 wherein the secondary amine functional reactive diluent contains, on average, 2 or more secondary amine groups per molecule.
14. A coating composition of claim 10 that additionally contains at least one pigment.
15. A coating composition of claim 10 wherein the hydroxy functional resin is an acrylic resin with a hydroxyl number in the range of 20-200.
16. A coating composition of claim 10 wherein the hydroxy functional resin is an acrylic resin grafted with natural or synthetic fatty acid ester and the resulting resin having a hydroxyl number in the range of 20-200.
17. A coating composition of claim 10 wherein the hydroxyl functional resin is a saturated or unsaturated polyester resin with a hydroxyl number of 20-200.

18. A coating composition of claim 10 wherein the isocyanate functional resin is chosen from aliphatic, aromatic or cycloaliphatic mono-, or di- isocyanates, triisocyanurates, uretdiones, biurets or isocyanate functional prepolymers.

19. A coating composition of claim 18 wherein the isocyanate functional resin is a dimer or trimer of hexamethylene diisocyanate or a blend of both.

20. A coating composition comprising the following:
a) at least one hydroxy functional resin,
b) at least one isocyanate functional resin,
c) a compound having the structure

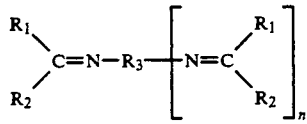

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain 0, N, S or Si.
$R_1$ and $R_2$ may be the same or different and
d) an hydroxyl functional reactive diluent.

21. A coating composition of claim 20 which is cured at ambient temperature.

22. A coating composition of claim 20 which is baked to cure.

23. A coating composition of claim 20 wherein the hydroxyl functional reactive diluent contains, on average, 2 or more hydroxyl groups per molecule.

24. A coating composition of claim 20 that additionally contains at least one pigment.

25. A coating composition of claim 20 wherein the hydroxy functional resin is an acrylic resin with a hydroxyl number in the range of 20-200.

26. A coating composition of claim 20 wherein the hydroxy functional resin is an acrylic resin grafted with natural or synthetic fatty acid ester and the resulting resin having a hydroxyl number in the range of 20-200.

27. A coating composition of claim 20 wherein the hydroxyl functional resin is a saturated or unsaturated polyester resin with a hydroxyl number of 20-200.

28. A coating composition of claim 20 wherein the isocyanate functional resin is chosen from aliphatic, aromatic or cycloaliphatic mono-, or di- isocyanates, triisocyanurates, uretdiones, biurets or isocyanate functional prepolymers.

29. A coating composition of claim 28 wherein the isocyanate functional resin is a dimer or trimer of hexamethylene diisocyanate or a blend of both.

30. A coating composition comprising the following:
a) at least one hydroxy functional resin,
b) at least one isocyanate functional resin,
c) a compound having the structure

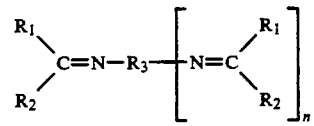

wherein
n is 0 to 4,
$R_1$ is —H, or alkyl, aryl, cycloaliphatic or substituted alkyl, aryl, or cycloaliphatic group,
$R_2$ is —H, or alkyl, aryl, cycloaliphatic or substituted alkyl, aryl, or cycloaliphatic group, and
$R_3$ is aliphatic, aromatic, arylaliphatic or cycloaliphatic group, which may also contain O, N, S or Si.
$R_1$ and $R_2$ may be the same or different and
d) an oxazolidine functional reactive diluent.

31. A coating composition of claim 30 which is cured at ambient temperature.

32. A coating composition of claim 30 which is baked to cure.

33. A coating composition of claim 30 that additionally contains at least one pigment.

34. A coating composition of claim 30 wherein the hydroxy functional resin is an acrylic resin with a hydroxyl number in the range of 20-200.

35. A coating composition of claim 30 wherein the hydroxy functional resin is an acrylic resin grafted with natural or synthetic fatty acid ester and the resulting resin having a hydroxyl number in the range of 20-200.

36. A coating composition of claim 30 wherein the hydroxyl functional resin is a saturated or unsaturated polyester resin with a hydroxyl number of 20-200.

37. A coating composition of claim 30 wherein the isocyanate functional resin is chosen from aliphatic, aromatic or cycloaliphatic mono-, or di- isocyanates, triisocyanurates, uretdiones, biurets or isocyanate functional prepolymers.

38. A coating composition of claim 37 wherein the isocyanate functional resin is a dimer or trimer of hexamethylene diisocyanate or a blend of both.

39. A coating composition comprising the following:
a) at least one hydroxy functional resin,
b) at least one isocyanate functional resin,
c) the reaction product of one mole of Isophorone Diamine with 2 moles of Isobutyraldehyde and
d) a secondary amine functional reactive diluent.

40. A coating composition of claim 39 wherein the isocyanate functional resin is a dimer or trimer of hexamethylene diisocyanate or a blend of both.

* * * * *